United States Patent
Rakesh et al.

(10) Patent No.: US 12,210,418 B2
(45) Date of Patent: Jan. 28, 2025

(54) PRE-BACKUP ANOMALOUS OBJECT DETECTION AND EXCLUSION RULE CREATION

(71) Applicant: Dell Products L.P., Round Rock, TX (US)

(72) Inventors: Aaditya Rakesh, Bathinda (IN); Upanshu Singhal, Bangalore (IN); Nancy Jain, Bengaluru (IN); Nitin Kumar, Ranchi (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/298,432

(22) Filed: Apr. 11, 2023

(65) Prior Publication Data

US 2024/0345928 A1 Oct. 17, 2024

(51) Int. Cl.
*G06F 11/14* (2006.01)
*G06F 3/06* (2006.01)

(52) U.S. Cl.
CPC ........ *G06F 11/1451* (2013.01); *G06F 3/0644* (2013.01); *G06F 3/067* (2013.01); *G06F 11/1469* (2013.01); *G06F 3/0619* (2013.01)

(58) Field of Classification Search
None
See application file for complete search history.

(56) References Cited

U.S. PATENT DOCUMENTS

| | | | | |
|---|---|---|---|---|
| 7,681,069 B1 * | 3/2010 | Chellappa | ........... | G06F 11/1435 714/13 |
| 8,341,198 B1 * | 12/2012 | Havewala | ............. | G06F 16/188 707/823 |
| 9,002,798 B1 * | 4/2015 | Raj | ........................ | G06F 16/128 707/654 |
| 2009/0106603 A1 * | 4/2009 | Dilman | ................. | G06F 11/327 714/E11.002 |
| 2012/0159243 A1 * | 6/2012 | Havewala | ........... | G06F 11/0727 714/15 |
| 2017/0223031 A1 * | 8/2017 | Gu | ....................... | G06F 11/1448 |
| 2017/0235641 A1 * | 8/2017 | Ancel | ................. | G06F 11/1458 707/654 |
| 2017/0364681 A1 * | 12/2017 | Roguine | ............... | G06F 21/554 |

(Continued)

*Primary Examiner* — Kaushikkumar M Patel
(74) *Attorney, Agent, or Firm* — Chamberlain, Hrdlicka, White, Williams & Aughtry; Aly Dossa

(57) ABSTRACT

A method, non-transitory computer readable medium, and a system for pre-backup anomalous object detection and exclusion rule creation. Enterprise information technology environments often include any number of assets maintaining vast quantities of data and state. Any asset, in turn, may be riddled with various anomalous objects that tend to cause backup failure. Embodiments described herein address backup failure due to the presence of anomalous objects by, during a pre-backup stage, examining any number of assets to identify any anomalous objects there-within. Once identified, the anomalous object(s) (or metadata descriptive thereof) may be recorded within a backup skip list and, subsequently, excluded from the current and/or any future backup(s). Exclusion of the anomalous object(s), from said backup(s), may be enforced through the automatic creation of one or many exclusion rule(s) that impact, and thus adjust, the backup policy/policies associated with the asset(s).

18 Claims, 10 Drawing Sheets

(56) References Cited

U.S. PATENT DOCUMENTS

2021/0406230 A1* 12/2021 Truong .............. G06F 11/1453
2022/0121376 A1*  4/2022 Rath ................. G06F 3/0652
2022/0138169 A1*  5/2022 Yelheri .............. G06F 3/065
                                                    707/695
2023/0017961 A1*  1/2023 Ronnau .............. G06F 11/1469

* cited by examiner

PRE-BACKUP ANOMALOUS OBJECT DETECTION AND EXCLUSION RULE CREATION

BACKGROUND

Any enterprise information technology (IT) environment often includes any number of assets (e.g., local storage, network attached storage (NAS) shares, virtual machines, and database applications, etc.) maintaining vast quantities of data and state pertinent to enterprise operations and/or services. Any asset, in turn, may be riddled with various anomalous objects—the presence of which tends to cause backup failure, thereby reducing backup performance and rendering enterprise data and state unprotected.

SUMMARY

In general, in one aspect, embodiments described herein relate to a method for exclusion rule creation. The method includes: identifying a target asset; for at least one target asset slice of multiple target asset slices partitioning the target asset: identifying an anomalous target asset slice object; adding object metadata for the anomalous target asset slice object to a slice skip list; and creating a backup exclusion rule based on the slice skip list.

In general, in one aspect, embodiments described herein relate to a non-transitory computer readable medium (CRM). The non-transitory CRM includes computer readable program code, which when executed by a computer processor, enables the computer processor to perform a method for exclusion rule creation. The method includes: identifying a target asset; for at least one target asset slice of multiple target asset slices partitioning the target asset: identifying an anomalous target asset slice object; adding object metadata for the anomalous target asset slice object to a slice skip list; and creating a backup exclusion rule based on the slice skip list.

In general, in one aspect, embodiments described herein relate to a system. The system includes: a target asset; an asset source through which the target asset is accessible, and includes: a first computer processor configured to at least in part perform a method for exclusion rule creation. The method includes: identifying the target asset; for at least one target asset slice of multiple target asset slices partitioning the target asset: identifying an anomalous target asset slice object; and adding object metadata for the anomalous target asset slice object to a slice skip list; and a backup service operatively connected to the asset source, and includes: a second computer processor configured to receive at least the slice skip list from the asset source and at least in part perform the method for exclusion rule creation. The method further includes: for the at least one target asset slice of the multiple target asset slices partitioning the target asset: creating a backup exclusion rule based on the slice skip list.

Other aspects described herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

DETAILED DESCRIPTION

Figure 1A:
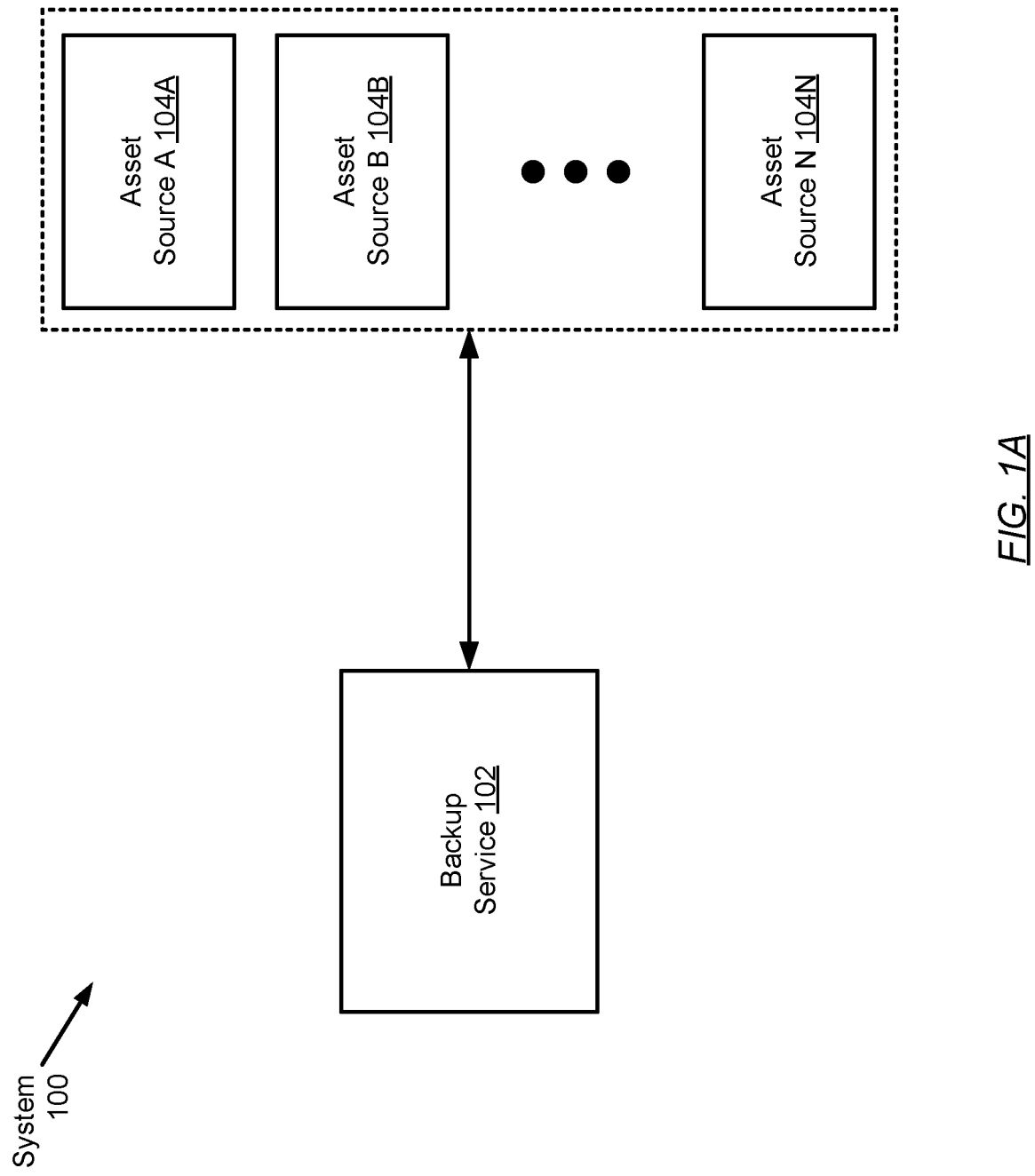
FIG. 1A shows a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to pre-backup anomalous object detection and exclusion rule creation. Particularly, any enterprise information technology (IT) environment often includes any number of assets (e.g., local storage, network attached storage (NAS) shares, virtual machines, and database applications, etc.) maintaining vast quantities of data and state pertinent to enterprise operations and/or services. Any asset, in turn, may be riddled with various anomalous objects taking form, for example, as irregular files (e.g., pipe, socket, or symbolic link files), corrupt or otherwise inaccessible files, cloud-tier files, orphaned files, compressed files, and snapshot directories. When attempting to backup any said asset(s), the presence of these anomalous objects tend to cause backup failure, thereby reducing backup performance and rendering enterprise data and state unprotected.

Further, existing technologies are ill-equipped to mitigate the issue—with many lacking the capabilities to detect, and much less filter out, said anomalous objects to guarantee backup success. Some existing technologies, when faced with compressed or cloud-tier files, hastily begin backing up these files, which first require rehydration (e.g., decompression, migration, or other forms of data/state reconstitution to regain accessibility of the data/state prior to backup) and, therefore, unnecessarily extend backup time. Other existing technologies, meanwhile, produce log files detailing backup failures, however, force administrators or users to manually comb though said log files in order to identify the reason(s) and/or any anomalous objects behind the backup failures.

Embodiments described herein, accordingly, address the above-mentioned issues through pre-backup anomalous object detection and exclusion rule creation. More specifically, during a pre-backup stage entailing any number of assets, said asset(s) may be examined to identify any anomalous objects there-within. Once identified, the anomalous object(s) (or metadata descriptive thereof) may be recorded within a backup skip list and, subsequently, excluded from the current backup, as well as any future backups, concerning the asset(s) on which the anomalous object(s) had been identified. Exclusion of the anomalous object(s), from any current and/or future backup(s), may be enacted through the automatic creation of one or many exclusion rule(s) that impact, and thus adjust, the backup policy/policies associated with the asset(s).

FIG. 1A shows a system in accordance with one or more embodiments described herein. The system (100) may include a backup service (102) and any number of asset sources (104A-104N). Each of these system (100) components is described below.

In one or many embodiment(s) described herein, the backup service (102) may represent any enterprise IT infrastructure at least configured to initiate pre-backup anomalous object detection and conduct pre-backup exclusion rule(s) creation. To that end, the backup service (102) may include functionality to generate and submit, to any asset source(s) (104A-104N), a pre-backup job specifying any target asset(s) (e.g., asset(s) (see e.g., FIG. 1C) targeted for backup) hosted on/by the asset source(s) (104A-104N), where the pre-backup job may direct the asset source(s) (104A-104N) to detect any anomalous object(s) within, and prior to the backup of, the target asset(s). The backup service (102) may also include functionality to perform the method illustrated and described with respect to FIGS. 3A-3C, below. One of ordinary skill, however, will appreciate that the backup service (102) may perform other functionalities without departing from the scope of the embodiments described herein.

In one or many embodiment(s) described herein, the backup service (102) may be implemented through on-premises infrastructure, cloud computing infrastructure, or any hybrid infrastructure thereof. The backup service (102), accordingly, may be implemented using one or more network servers (not shown), where each network server may represent a physical or a virtual network server. Additionally, or alternatively, the backup service (102) be implemented using one or more computing systems similar to the exemplary computing system shown in FIG. 4. Moreover, the backup service (102) is illustrated and described in further detail with respect to FIG. 1B, below.

In one or many embodiment(s) described herein, any asset source (104A-104N) may represent any physical appliance or computing system configured to receive, generate, process, store, and/or transmit data (and metadata descriptive thereof), as well as to provide an environment in which any number of computer programs and/or assets (see e.g., FIG. 1C) may execute or be maintained thereon. The computer program(s) may, for example, implement large-scale and complex data processing; or implement one or more services offered locally or over a network, whereas the asset(s) may retain the vast quantities of data and state pertinent to enterprise operations and/or services.

Further, in one or many embodiment(s) described herein, in providing an execution environment for any computer program(s) installed thereon, any asset source (104A-104N) may include and allocate various resources (e.g., computer processors, memory, storage, virtualization, network bandwidth, etc.), as needed, to the computer program(s) and/or the tasks (or processes) instantiated thereby. One of ordinary skill, however, will appreciate that any asset source (104A-104N) may perform other functionalities without departing from the scope of the embodiments described herein. Examples of any asset source (104A-104N) may include, but may not be limited to, a desktop computer, a laptop computer, a network server, a network mainframe, a smartphone, a tablet computer, or any other computing system similar to the exemplary computing system shown in FIG. 4. Moreover, any asset source (104A-104N) is illustrated and described in further detail with respect to FIG. 1C, below.

In one or many embodiment(s) described herein, the above-mentioned system (100) components (or subcomponents thereof) may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1A shows a configuration of components and/or subcomponents, other system (100) configurations may be used without departing from the scope of the embodiments described herein.

Figure 1B:
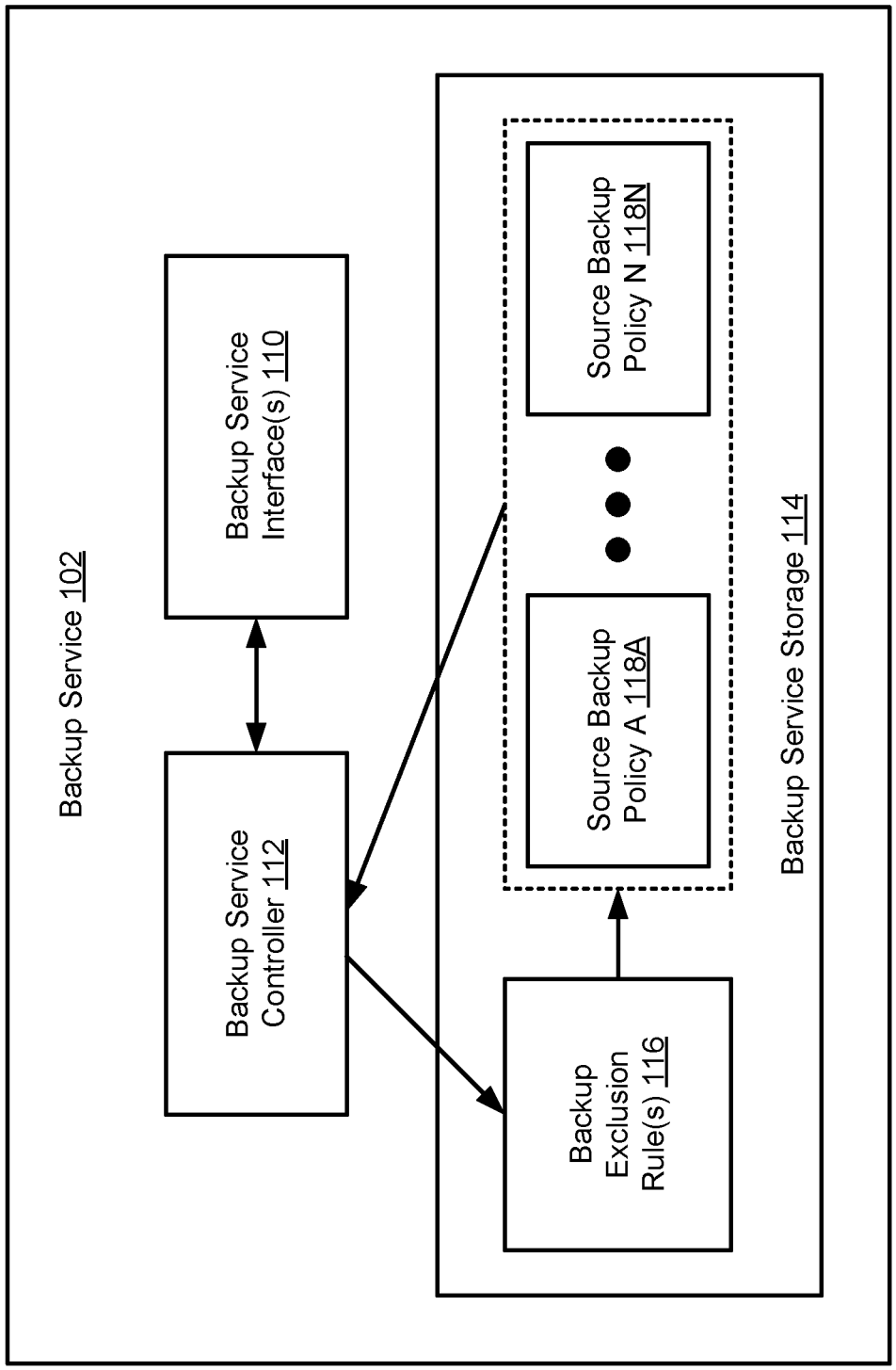
FIG. 1B shows a backup service in accordance with one or more embodiments described herein.

FIG. 1B shows a backup service in accordance with one or more embodiments described herein. The backup service (102) may include any number of backup service interfaces (110), a backup service controller (112), and backup service storage (114). Each of these backup service (102) components is described below.

In one or many embodiment(s) described herein, any backup service interface (110) may refer to networking hardware (e.g., a network card or adapter), a computer program implementing a logical interface (e.g., an application programming interface (API)) and executing on the underlying hardware of the backup service (102), an inter-activity protocol, or any combination thereof, configured to enable or facilitate communications (or information exchange) between the backup service (102) and other entities (e.g., any number of asset sources (see e.g., FIGS. 1A and 1C)).

To that end, in one or many embodiment(s) described herein, any backup service interface (110) may include functionality to: obtain any number of pre-backup jobs, each specifying any number of target assets, from the backup service controller (112); transmit the obtained pre-backup job(s) to any number of asset sources on which said target asset(s), specified in the obtained pre-backup job(s), is/are maintained; receive, in response to the transmitted pre-backup job(s), target asset backup metadata for the target asset(s) from the asset source(s); provide the received target asset backup metadata for the target asset(s) to the backup service controller (112); obtain, following processing of the provided target asset backup metadata for the target asset(s) (see e.g., FIGS. 3A-3C), any number of target asset backup objects, for the target asset(s), from the backup service controller (112); and transmit the obtained target asset backup object(s), for the target asset(s), to the asset source(s) on which said target asset(s) is/are maintained. One of ordinary skill, however, will appreciate that any backup service interface (110) may perform other functionalities without departing from the scope of the embodiments described herein.

In one or many embodiment(s) described herein, the backup service controller (112) may refer to instruction-processing hardware (e.g., any number of integrated circuits for processing computer readable instructions), a computer program executing on the underlying hardware of the backup service (102), or any combination thereof, configured to oversee and/or manage backup service (102) operations. To that end, the backup service controller (112) may include functionality to: generate and provide, to the backup service interface(s) (110) for transmission towards any number of asset sources, any number of pre-backup jobs each specifying any number of target assets maintained on the asset source(s); obtain target asset backup metadata for the target asset(s) from the backup service interface(s) (110); process the obtained target asset backup metadata, for the target asset(s), at least in part per the method illustrated and described with respect to FIGS. 3A-3C, below, to create any number of target asset backup objects for the target asset(s); and provide the created target asset backup object(s), for the target asset(s), to the backup service interface(s) (110) for transmission towards the asset source(s). One of ordinary skill, however, will appreciate that the backup service controller (112) may perform other functionalities without departing from the scope of the embodiments described herein.

In one or many embodiment(s) described herein, the backup service storage (114) may refer to a collection of one or more physical storage devices (not shown) on which various forms of digital information—e.g., any number of backup exclusion rules (116) (described below) and any number of source backup policies (118A-118N) (described below)—may be maintained. Each physical storage device may encompass non-transitory computer readable storage media on which said digital information may be stored in whole or in part, and temporarily or permanently. Further, the backup service storage (114) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one or many embodiment(s) described herein, any backup exclusion rule (116) may refer to a rule (or filter) configured to exclude any number of specified directories and/or files from any current and/or future backup operation(s) centered about any given asset source. The specified directory/directories and/or file(s), accordingly, may reflect anomalous object(s) detected by, and thus maintained on, the given asset source during their processing of any pre-backup job(s) (see e.g., FIGS. 2A-2C) directed thereto from/by the backup service (102). Further, any backup exclusion rule (116) may be dynamically created by the backup service controller (112) (see e.g., FIGS. 3A-3C) based, at least in part, on any received target asset backup metadata from, and for any target asset(s) specified in any pre-backup job(s) directed to, the given asset source.

In one or many embodiment(s) described herein, any source backup policy (118A-118N) may refer to a set of rules and procedures outlining a strategy for protecting (e.g., via any number of backup operations) data, metadata, and/or state maintained on any given asset source. The set of rules and procedures may, for example, dictate: which data, metadata, and/or state maintained on the given asset source should be protected; where (e.g., one or more target storages) should backup copies of any protected data, metadata, and/or state be stored; how often should a backup operation centered about the given asset source transpire; and how long should any backup copies of any protected data, metadata, and/or state be retained. The set of rules and procedures may further include, or may be adjusted based on, any created backup exclusion rule(s) (116) relevant to the given asset source.

While FIG. 1B shows a configuration of components and/or subcomponents, other backup service (102) configurations may be used without departing from the scope of the embodiments described herein.

Figure 1C:
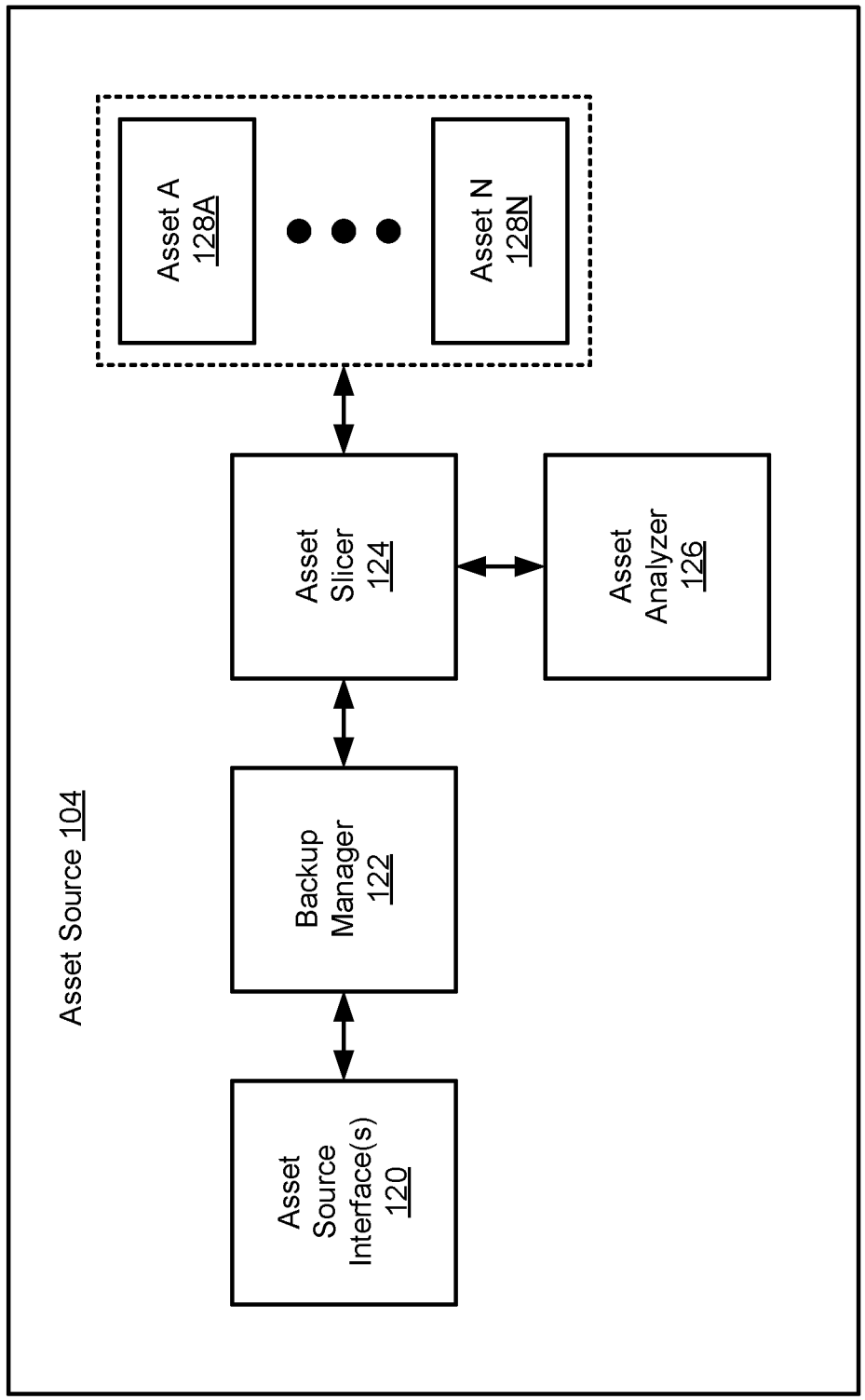
FIG. 1C shows an asset source in accordance with one or more embodiments described herein.

FIG. 1C shows an asset source in accordance with one or more embodiments described herein. The asset source (104) may include any number of asset source interfaces (120), a backup manager (122), an asset slicer (124), an asset analyzer (126), and any number of assets (128A-128N). Each of these asset source (104) components is described below.

In one or many embodiment(s) described herein, any asset source interface (120) may refer to networking hardware (e.g., a network card or adapter), a computer program implementing a logical interface (e.g., an application programming interface (API)) and executing on the underlying hardware of the asset source (104), an interactivity protocol, or any combination thereof, configured to enable or facilitate communications (or information exchange) between the asset source (104) and other entities (e.g., the backup service (see e.g., FIGS. 1A and 1B)).

To that end, in one or many embodiment(s) described herein, any asset source interface (120) may include functionality to: receive any number of pre-backup jobs, each specifying any number of target assets (e.g., any specified asset(s) (128A-128N)), from the backup service; provide the received pre-backup job(s) to the backup manager (122) for processing; obtain target asset backup metadata for the target asset(s) from the backup manager (122); transmit the obtained target asset backup metadata for the target asset(s) to the backup service; receive any number of target asset backup objects, for the target asset(s), from the backup service; and provide the received target asset backup object(s), for the target asset(s), to the backup manager (122) for processing. One of ordinary skill, however, will appreciate that any asset source interface (120) may perform other functionalities without departing from the scope of the embodiments described herein.

In one or many embodiment(s) described herein, the backup manager (122) may refer to instruction-processing hardware (e.g., any number of integrated circuits for processing computer readable instructions), a computer program executing on the underlying hardware of the asset source (104), or any combination thereof, configured to oversee and/or manage backup operations on the asset source (104). To that end, the backup manager (122) may include functionality to: obtain any number of pre-backup jobs, each specifying any number of target assets (e.g., any specified asset(s) (128A-128N)), from any asset source interface (120); instruct or invoke the asset slicer (124) to partition (or slice) each target asset into multiple target asset slices; for each target asset slice (via one of multiple parallel threads) of any given target asset: (i) identify any number of target asset slice objects (e.g., directories and/or files); (ii) instruct or invoke the asset analyzer (126) (via the asset slicer (124)) to assess the identified target asset slice object(s) to detect any number of anomalous target asset slice objects (e.g., anomalous directories and/or files); (iii) gather object metadata for both the detected anomalous target asset slice object(s) and any number of regular (i.e., non-anomalous) target asset slice objects; and (iv) add the gathered object metadata for the detected anomalous target asset slice object(s) to one or more slice skip list(s), while adding the gathered object metadata for the regular target asset slice object(s) to one or more slice non-skip list(s); create target asset backup metadata for the target asset(s) based, at least in part, on any number of slice skip and non-skip lists; provide the created target asset backup metadata, for the target asset(s), to any asset source interface (120) for transmission towards the backup service; and obtain any number of target asset backup objects, for the target asset(s), from any asset source interface (120). One of ordinary skill, however, will appreciate that the backup manager (122) may perform other functionalities without departing from the scope of the embodiments described herein.

In one or many embodiment(s) described herein, the asset slicer (124) may refer to instruction-processing hardware (e.g., any number of integrated circuits for processing computer readable instructions), a computer program executing on the underlying hardware of the asset source (104), or any combination thereof, configured to partition or slice each of any number of target assets (e.g., any specified asset(s) (128A-128N)) maintained on the asset source (104). To that end, the asset slicer (124) may include functionality to: based on instructions obtained, or an invocation, from the backup manager (122)—create multiple target asset slices from each of the target asset(s); and relay instructions to, or an invocation of, the asset analyzer (126) from/by the backup manager (122), where said instructions or invocation may lead the asset analyzer (126) to assess any number target asset slice objects (e.g., directories and/or files), for each target asset slice of the target asset(s), to detect any number of anomalous target asset slice objects (e.g., anomalous directories and/or files). One of ordinary skill, however, will appreciate that the asset slicer (124) may perform other functionalities without departing from the scope of the embodiments described herein.

In one or many embodiment(s) described herein, the asset analyzer (126) may refer to instruction-processing hardware (e.g., any number of integrated circuits for processing computer readable instructions), a computer program executing on the underlying hardware of the asset source (104), or any combination thereof, configured to assess whether the directory/directories and/or files of any number of target assets, maintained on the asset source (104), is/are anomalous. To that end, the asset analyzer (126) may include functionality to: based on instructions obtained, or an invocation, from the backup manager (122) yet via the asset slicer (124)—assess any number target asset slice objects (e.g., directories and/or files), for each target asset slice of the target asset(s), to detect any number of anomalous target asset slice objects (e.g., anomalous directories and/or files). One of ordinary skill, however, will appreciate that the asset analyzer (126) may perform other functionalities without departing from the scope of the embodiments described herein.

In one or many embodiment(s) described herein, any asset (128A-128N) may refer to any physical or logical construct configured to access and/or maintain enterprise information (e.g., data, metadata, and/or state). Said enterprise information may, for example, be pertinent to enterprise operations and/or services. Further, said enterprise information, on any asset (128A-128N), may be organized and accessible through one or more file system implementations (e.g., disk file system(s), distributed file system(s), etc.). Examples of any asset (128A-128N) may include local storage, network attached storage (NAS) shares, virtual machines, and database applications. Any asset (128A-128N), moreover, is not limited to the aforementioned specific examples.

While FIG. 1C shows a configuration of components and/or subcomponents, other asset source (104) configurations may be used without departing from the scope of the embodiments described herein.

Figure 2A:
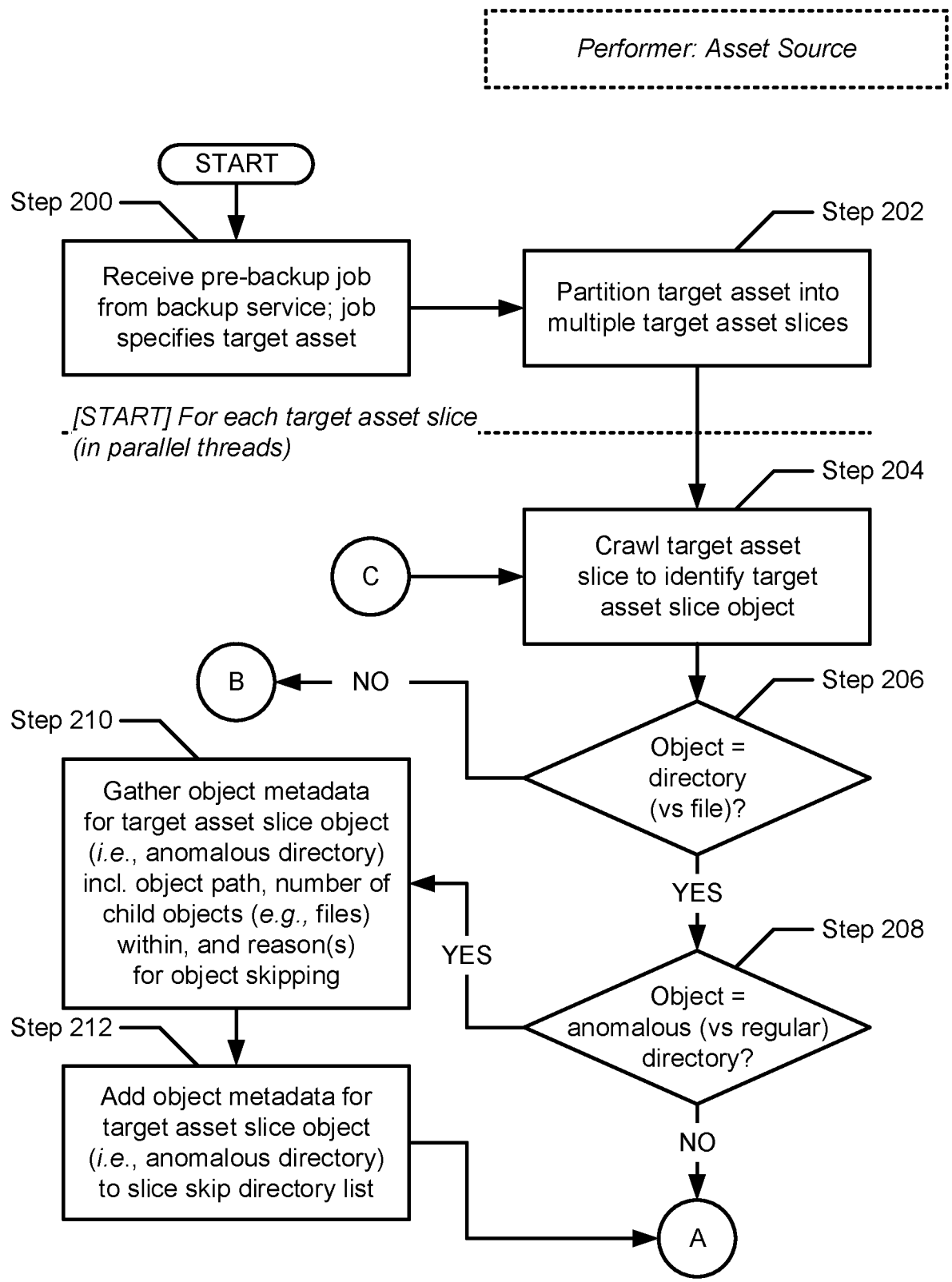
FIGS. 2A-2C show flowcharts describing a method for pre-backup anomalous object detection in accordance with one or more embodiments described herein.
Figure 2B:
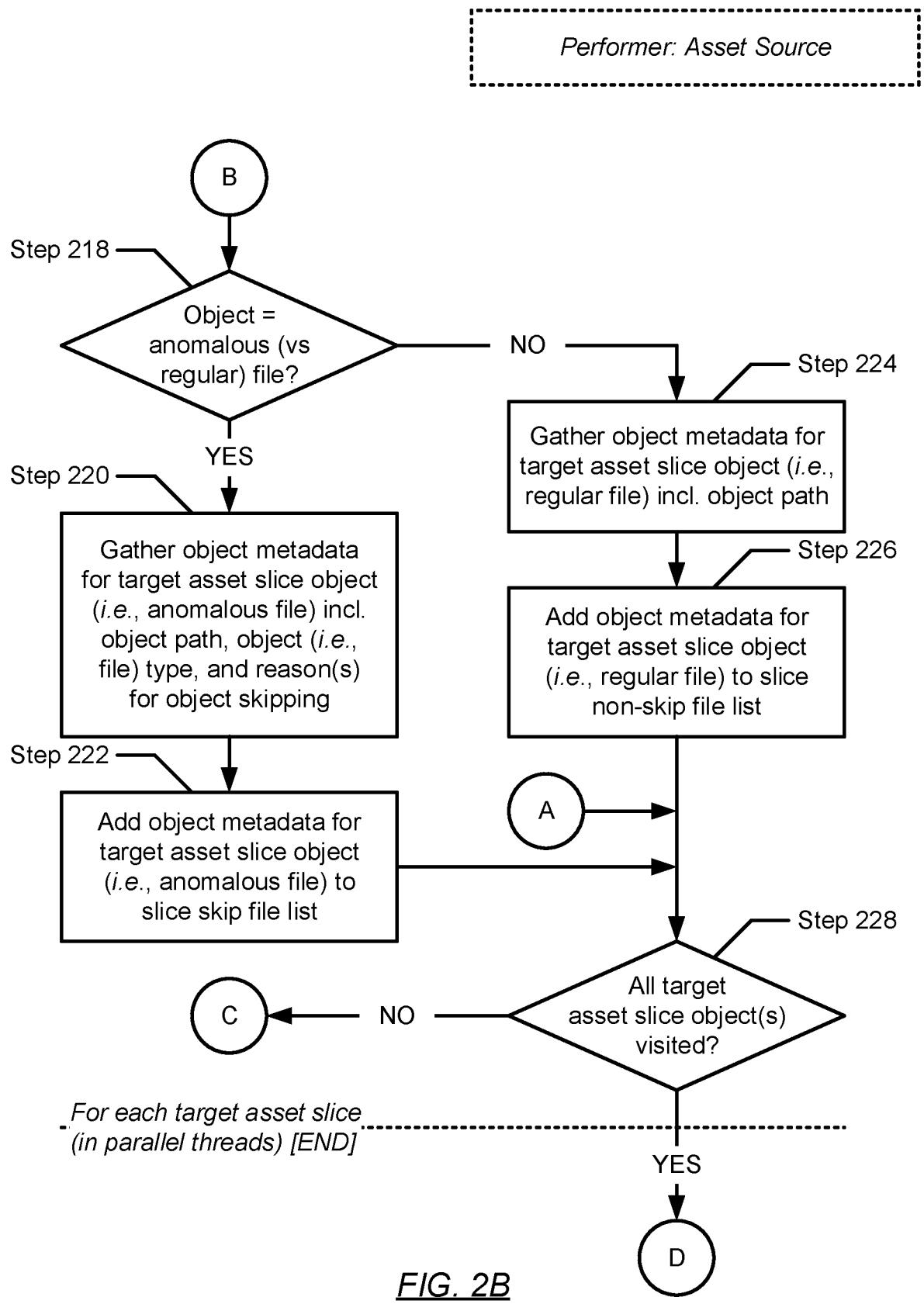
Figure 2C:
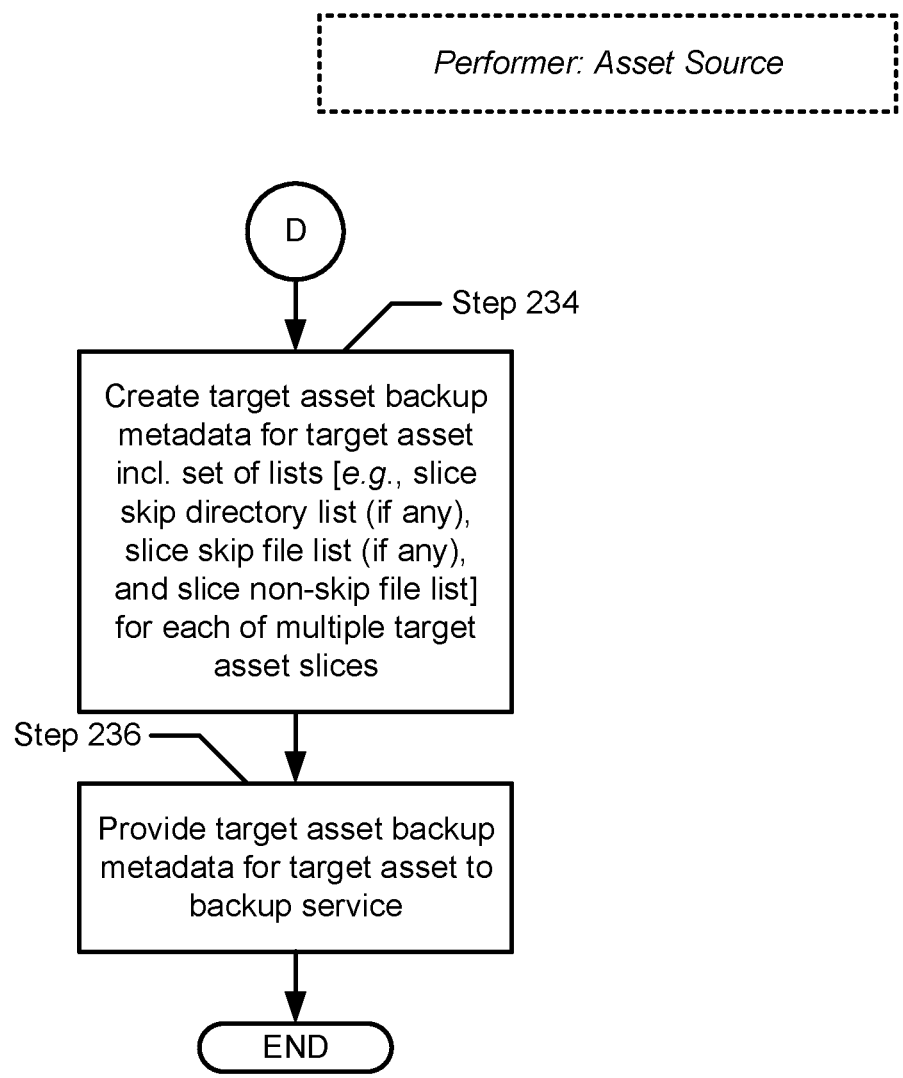

FIGS. 2A-2C show flowcharts describing a method for pre-backup anomalous object detection in accordance with one or more embodiments described herein. The various steps outlined below may be performed by any asset source (see e.g., FIGS. 1A and 1C). Further, while the various steps in the flowchart are presented and described sequentially, one of ordinary skill will appreciate that some or all steps may be executed in different orders, may be combined or omitted, and some or all steps may be executed in parallel.

Turning to FIG. 2A, in Step 200, a pre-backup job is received from the backup service (see e.g., FIGS. 1A and 1B). In one or many embodiment(s) described herein, the pre-backup job may specify a target asset (e.g., an asset targeted for backup) accessible by/through the asset source. Further, the pre-backup job may direct the asset source to detect any anomalous object(s) (e.g., irregular directories and/or files) within, and prior to the backup of, the specified target asset.

In Step 202, the target asset (specified in the pre-backup job received in Step 200) is partitioned into multiple target asset slices. In one or many embodiment(s) described herein, the multiple target asset slices may be created, respectively, using multiple concurrent or parallel threads. Further, each target asset slice may be created such that a target asset slice size thereof does not exceed a predefined target asset slice size expressed either in bytes (e.g., 200 GB) or in a number of files (e.g., 1 million files). Moreover, as the target asset may encompass enterprise information (e.g., data, metadata, and/or state) organized and accessible through one or more file system implementations, each target asset slice created therefrom may include a portion of said enterprise information, as well as a corresponding portion of said file system implementation(s) respectively organizing and providing accessibility to said enterprise information portion.

A subset of the remaining steps (i.e., Steps 204, 206, 208, 210, 212, 218, 220, 222, 224, 226, and 228) presented and described hereinafter are pertinent to, and thus are performed for, each target asset slice of the multiple target asset slices (created in Step 202). Further, any given instance of the aforementioned subset of remaining steps, respective to any given target asset slice, may be executed concurrently or in parallel with any other instance(s) of the same respective to any other target asset slice(s).

In Step 204, following partitioning of the target asset (in Step 202) or a determination (made in Step 228) that not all target asset slice object(s) of the target asset slice have been visited/processed, the target asset slice is crawled to identify a target asset slice object. In one or many embodiment(s) described herein, crawling of the target asset slice may, for example, entail descending through the portion of file system implementation(s) representative thereof using a depth first search (DFS) traversal algorithm. Further, the identified target asset slice object may either represent a directory or a file.

In Step 206, a determination is made as to whether the target asset slice object (identified in Step 204) is a directory versus a file. In one or many embodiment(s) described herein, if it is determined that the target asset slice object represents a directory, then the method proceeds to Step 208. On the other hand, in one or many other embodiment(s) described herein, if it is alternatively determined that the target asset slice object represents a file, then the method alternatively proceeds to Step 218 (see e.g., FIG. 2B).

In Step 208, following the determination (made in Step 206) that the target asset slice object (identified in Step 204) represents a directory, a determination is made as to whether the target asset slice object is an anomalous directory (described below) versus a regular directory. In one or many embodiment(s) described herein, if it is determined that the target asset slice object represents an anomalous directory, then the method proceeds to Step 210. On the other hand, in one or many embodiment(s) described herein, if it is alternatively determined that the target asset slice object represents a regular directory, then the method alternatively proceeds to Step 228 (see e.g., FIG. 2B).

In one or many embodiment(s) described herein, an anomalous or irregular directory may refer to any directory known to hinder backup operation success. Said anomalous directory/directories may, for example, be identified through analyses of a history of failed backup operations centered about one or many target asset(s). Further, an example of an anomalous directory may include a snapshot directory. A snapshot directory may refer to any directory that includes one or more snapshots (i.e., copies) of the enterprise information (or at least a portion thereof) made accessible at least through the target asset slice. Further, due to their snapshot content, said snapshot directories thus include vast amounts of redundant data, metadata, and/or state, which, if not skipped, would be backed up and, therefore, lead to the unnecessary extension of the backup window for the backup operation—where extension of the backup window would/could increase the susceptibility of the backup operation to experience failure due to other factors (e.g., media failure, human error, software updates, cyber-attacks, and/or infrastructure failure). Other examples of an anomalous directory may include a hidden directory (e.g., any directory not displayed by default in a directory listing, which may, for example, store user preferences or utility state) and a corrupt directory (e.g., any inaccessible or unreadable directory inflicted due to, for example, malware or storage hardware defects). Moreover, any anomalous directory is not limited to the aforementioned specific examples.

Returning to the method, in Step 210, following the determination (made in Step 208) that the target asset slice object (identified in Step 204) represents an anomalous directory, object metadata, for the target asset slice object, is gathered. In one or many embodiment(s) described herein, the object metadata may include: an object path specifying a file system location of the target asset slice object; a number or cardinality of child objects (e.g., sub-directories and/or files) (if any) contained within/by the target asset slice object; and at least one reason (exemplified below) justifying a skipping of the target asset slice object from any current/future backup operation(s).

Examples of the above-mentioned reason(s) for justifying the skipping of any directory known to be anomalous may include identifying the directory as: a snapshot directory; a hidden directory; or a corrupt directory. Further, said reason(s) is/are not limited to the aforementioned specific examples.

In Step 212, the object metadata (gathered in Step 210), for the target asset slice object (identified in Step 204 and determined to be an anomalous directory in Step 208), is added to a slice skip directory list. In one or many embodiment(s) described herein, the slice skip directory list may refer to a document (e.g., a JavaScript Object Notation (JSON) file, a Comma Separated Values (CSV) file, a Yet Another Markup Language (YAML) file, etc.) configured to include the object metadata for any number of anomalous directories identified in the target asset slice.

Hereinafter, following Step 212, the method proceeds to Step 228 (see e.g., FIG. 2B).

Turning to FIG. 2B, in Step 218, following the determination (made in Step 206) that the target asset slice object (identified in Step 204) represents a file, a determination is made as to whether the target asset slice object is an anomalous file (described below) versus a regular file. In one or many embodiment(s) described herein, if it is determined that the target asset slice object represents an anomalous file, then the method proceeds to Step 220. On the other hand, in one or many embodiment(s) described herein, if it is alternatively determined that the target asset slice object represents a regular file, then the method alternatively proceeds to Step 224.

In one or many embodiment(s) described herein, an anomalous or irregular file may refer to any file known to hinder backup operation success. Said anomalous file(s) may, for example, be identified through analyses of a history of failed backup operations centered about one or many target asset(s). Further, examples of an anomalous file may include, but may not be limited to: any corrupt file (i.e., any file incapable of being opened); any irregular file such as any file(s) created for inter-process communication (IPC) purposes (e.g., pipe files, socket files, etc.) or any file(s) created to point to other file system objects (e.g., symbolic link files, etc.); any inaccessible file due to lack of access permissions; any cloud-tier file (i.e., any file residing on cloud computing infrastructure, which would require rehydration); any orphan file (e.g., any file rendered obsolete due to a computer program it was once associated with has been deleted or uninstalled); and any compressed or deduplicated file.

Returning to the method, in Step 220, following the determination (made in Step 218) that the target asset slice object (identified in Step 204) represents an anomalous file, object metadata, for the target asset slice object, is gathered. In one or many embodiment(s) described herein, the object metadata may include: an object path specifying a file system location of the target asset slice object; an object type (i.e., file type, format, and/or extension) associated with the target asset slice object; and at least one reason (exemplified below) justifying a skipping of the target asset slice object from any current/future backup operation(s).

Examples of the above-mentioned reason(s) for justifying the skipping of any file known to be anomalous may include identifying the file as: a corrupt file; a pipe file; a socket file; a symbolic link file; a cloud-tier file; an orphan file; a compressed file; and a deduplicated file. Further, said reason(s) is/are not limited to the aforementioned specific examples.

In Step 222, the object metadata (gathered in Step 220), for the target asset slice object (identified in Step 204 and determined to be an anomalous file in Step 218), is added to a slice skip file list. In one or many embodiment(s) described herein, the slice skip file list may refer to a document (e.g., a JavaScript Object Notation (JSON) file, a Comma Separated Values (CSV) file, a Yet Another Markup Language (YAML) file, etc.) configured to include the object metadata for any number of anomalous files identified in the target asset slice.

Hereinafter, following Step 222, the method proceeds to Step 228 (described below).

In Step 224, following the alternate determination (made in Step 218) that the target asset slice object (identified in Step 204) represents a regular file, object metadata, for the target asset slice object, is gathered. In one or many embodiment(s) described herein, the object metadata may include an object path specifying a file system location of the target asset slice object.

In Step 226, the object metadata (gathered in Step 224), for the target asset slice object (identified in Step 204 and determined to be a regular file in Step 218), is added to a slice non-skip file list. In one or many embodiment(s) described herein, the slice non-skip file list may refer to a document (e.g., a JavaScript Object Notation (JSON) file, a Comma Separated Values (CSV) file, a Yet Another Markup Language (YAML) file, etc.) configured to include the object metadata for any number of regular files identified in the target asset slice.

In Step 228, (i) following the alternate determination (made in Step 208) that the target asset slice object (identified in Step 204) represents a regular directory, (ii) following addition of object metadata (in Step 212) to a slice skip directory list, (iii) following addition of object metadata (in Step 222) to a slice skip file list, or (iv) following addition of object metadata (in Step 226) to a slice non-skip file list, a determination is made as to whether all target asset slice object(s), of the target asset slice, has/have been visited/processed. In one or many embodiment(s) described herein, if it is determined that at least one target asset slice object remains to be visited via crawling of the target asset slice and thus processed, then the method proceeds to Step 204 (see e.g., FIG. 2A). On the other hand, in one or many embodiment(s) described herein, if it is alternatively determined that zero target asset slice objects remain to be visited via crawling of the target asset slice and thus processed, then the method alternatively proceeds to Step 234 (see e.g., FIG. 2C).

Turning to FIG. 2C, in Step 234, following the alternate determination (made in Step 228) that zero target asset slice objects remain to be visited via crawling of each of the multiple target asset slices (created in Step 202), target asset backup metadata, for the target asset (specified in the pre-backup job received in Step 200), is created. In one or many embodiment(s) described herein, the target asset backup metadata may include a set of lists—the set of lists, in turn, may include: the slice skip directory list (to which anomalous directory object metadata may have been added in Step 212) (if any) for each target asset slice of the multiple target asset slices created from the target asset; the slice skip file list (to which anomalous file object metadata may have been added in Step 222) (if any) for each target asset slice of the multiple target asset slices created from the target asset; and/or the slice non-skip file list (to which regular file object metadata may have been added in Step 226) (if any) for each target asset slice of the multiple target asset slices created from the target asset.

In one or many embodiment(s) described herein, any anomalous directory/directories and/or file(s) may not be discovered in all/each of the multiple target asset slices (created in Step 202). Accordingly, in said embodiment(s), not all/each of the multiple target asset slices may have a slice skip directory list and/or a slice skip file list associated therewith. In one or many other embodiment(s) described herein, at least one anomalous directory and/or file may be discovered in all/each of the multiple target asset slices. Accordingly, in said other embodiment(s), all/each of the multiple target asset slices may have a slice skip directory list and/or a slice skip file list associated therewith.

In Step 236, the target asset backup metadata (created in Step 234), for the target asset (specified in the pre-backup job received in Step 200), is provided, or otherwise transmitted, to the backup service as a response to the received pre-backup job.

Figure 3A:
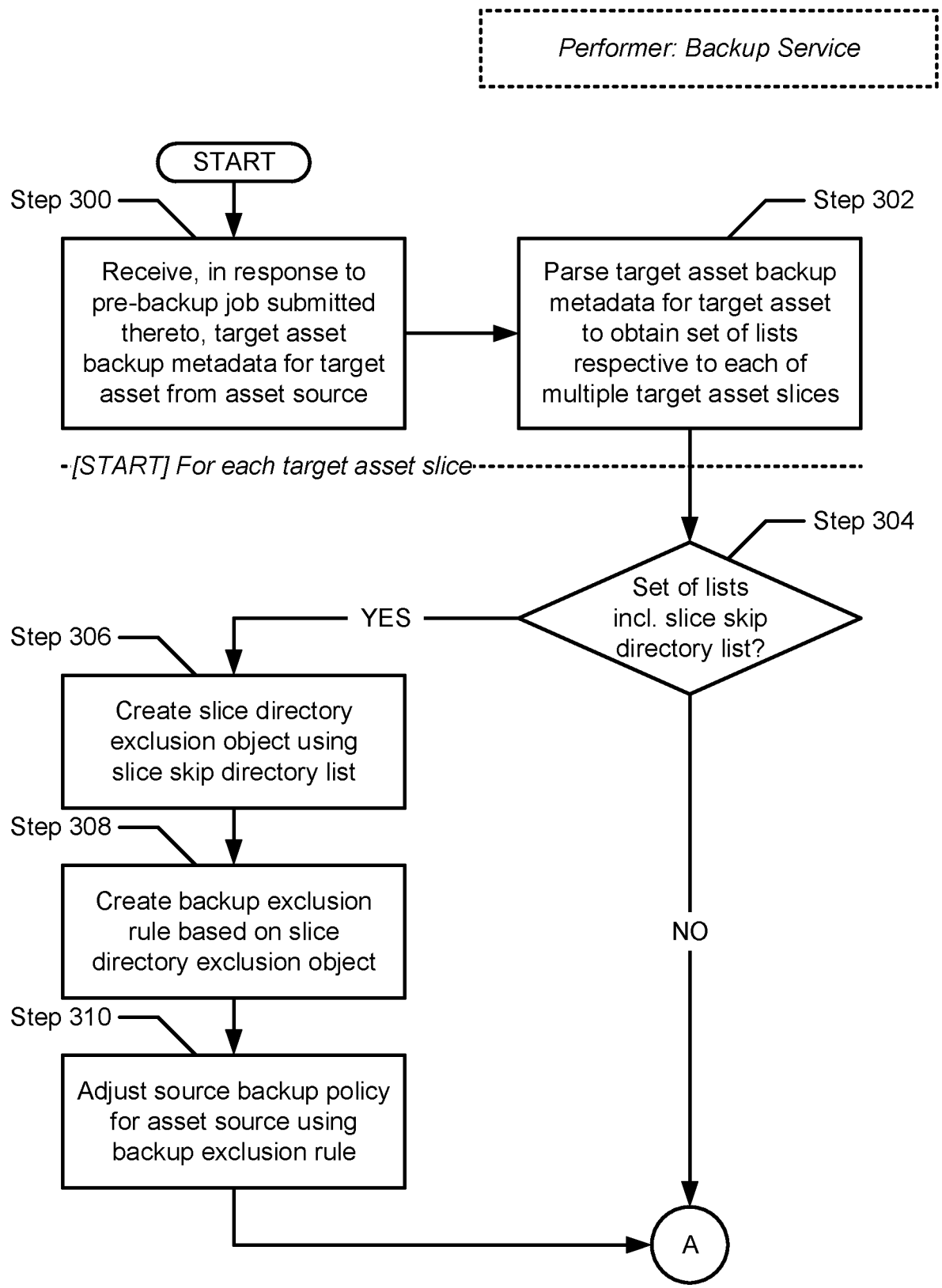
FIGS. 3A-3C show flowcharts describing a method for pre-backup exclusion rule creation in accordance with one or more embodiments described herein.
Figure 3B:
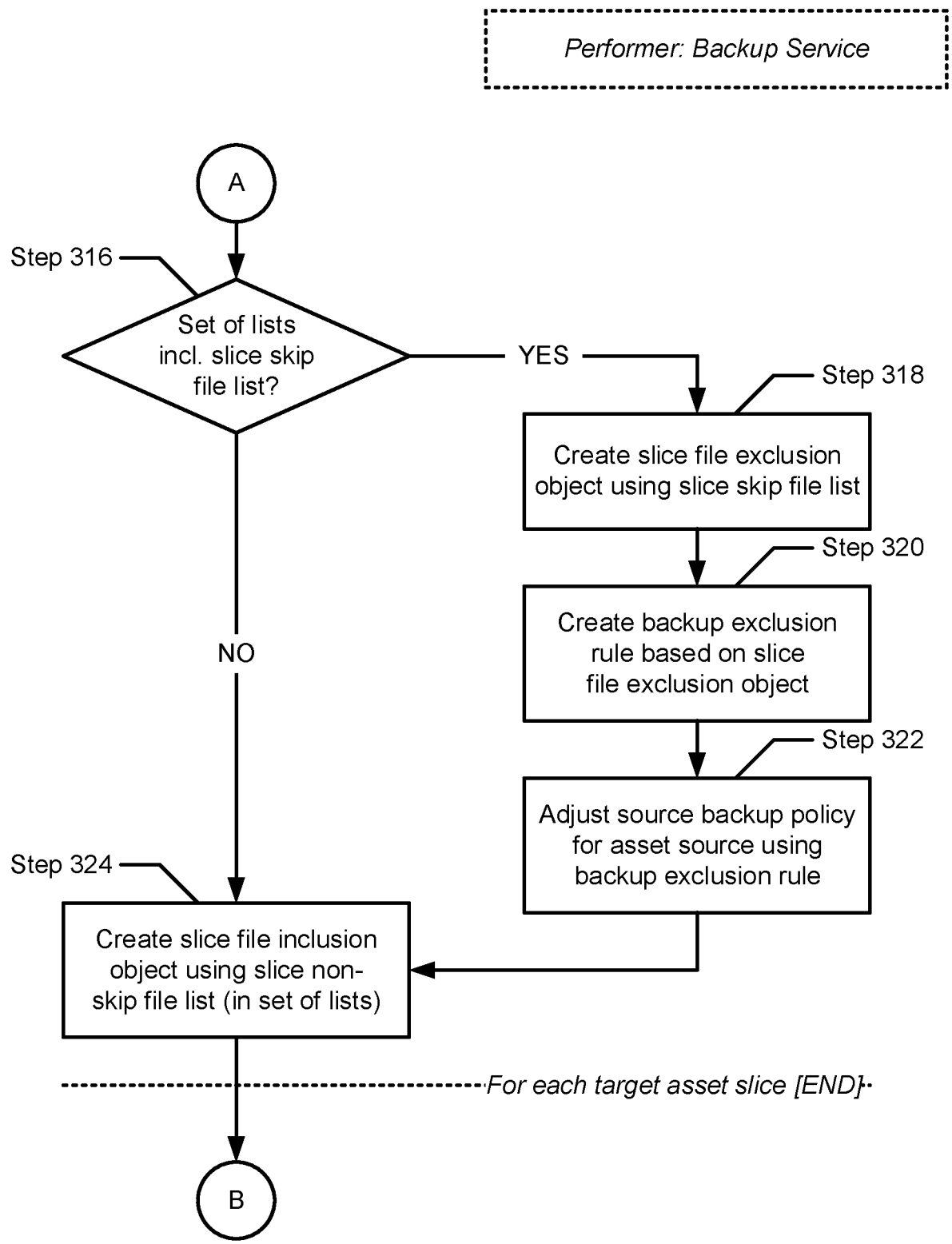
Figure 3C:
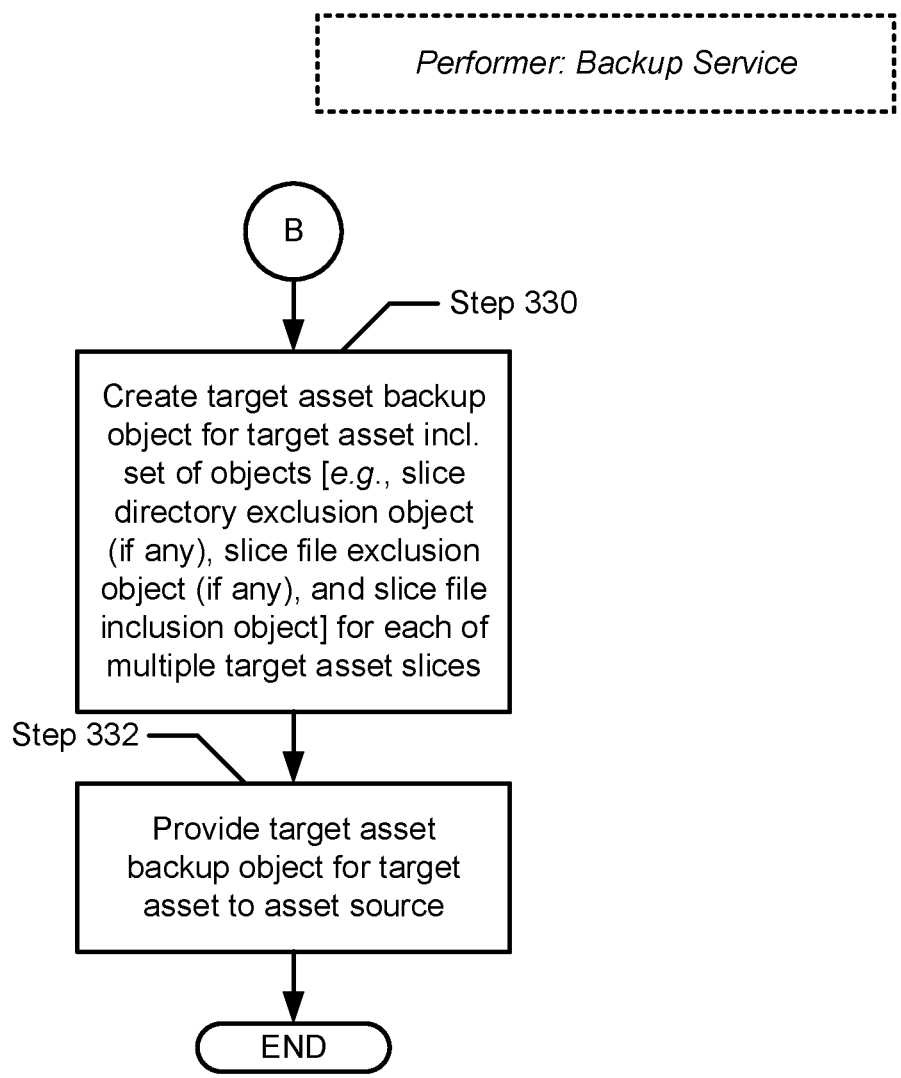

FIGS. 3A-3C show flowcharts describing a method for pre-backup exclusion rule creation in accordance with one or more embodiments described herein. The various steps outlined below may be performed by the backup service (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 3A, in Step 300, target asset backup metadata, for a target asset accessible there-through, is received from an asset source (see e.g., FIGS. 1A and 1C). In one or many embodiment(s) described herein, the target asset backup metadata may represent a response to a pre-backup job submitted to the asset source from the backup service. Further, the target asset backup metadata may include a set of lists—the set of lists, in turn, may include: a slice skip directory list (if any) for each of multiple target asset slices created from the target asset; a slice skip file list (if any) for each of the multiple target asset slices created from the target asset; and/or a slice non-skip file list (if any) for each of the multiple target asset slices created from the target asset.

In Step 302, the target asset backup metadata (received in Step 300), for the target asset, is parsed to obtain the above-mentioned set of lists for each of multiple target asset slices created from the target asset.

A subset of the remaining steps (i.e., Steps 304, 306, 308, 310, 316, 318, 320, 322, and 324) presented and described hereinafter are pertinent to, and thus are performed for, each target asset slice of the multiple target asset slices created from the target asset (for which target asset backup metadata had been received in Step 300).

In Step 302, following parsing (in Step 302) of the target asset backup metadata (received in Step 300), a determination is made as to whether the set of lists (obtained in Step 302), for the target asset slice, includes a slice skip directory list (described below). In one or many embodiment(s) described herein, if it is determined that the set of lists, for the target asset slice, includes a slice skip directory list, then the method proceeds to Step 306. On the other hand, in one or many other embodiment(s) described herein, if it is alternatively determined that the set of lists, for the target asset slice, excludes a slice skip directory list, then the method alternatively proceeds to Step 316 (see e.g., FIG. 3B).

In one or many embodiment(s) described herein, the slice skip directory list may refer to a document (e.g., a JavaScript Object Notation (JSON) file, a Comma Separated Values (CSV) file, a Yet Another Markup Language (YAML) file, etc.) configured to include object metadata for any number of anomalous directories identified in the target asset slice. Further, said object metadata, for any given anomalous directory, may include: an object path specifying a file system location of the given anomalous directory; a number or cardinality of child objects (e.g., sub-directories and/or files) (if any) contained within/by the given anomalous directory; and at least one reason (exemplified above-see e.g., FIGS. 2A-2C) justifying a skipping of the given anomalous directory from any current/future backup operation(s).

Returning to the method, in Step 306, following the determination (made in Step 304) that the set of lists (obtained in Step 302), for the target asset slice, includes a slice skip directory list, a slice directory exclusion object, for the target asset slice, is created. In one or many embodiment(s) described herein, the slice directory exclusion object may refer to a data container or a data structure configured to maintain the slice skip directory list.

In Step 308, based on the slice directory exclusion object (created in Step 306), a backup exclusion rule is created. In one or many embodiment(s) described herein, the backup exclusion rule may refer to a rule (or filter) configured to exclude the anomalous directory, represented through the slice directory exclusion object, from any current and/or future backup operation(s) centered at least about the target asset.

In Step 310, using the backup exclusion rule (created in Step 308), a source backup policy, for an asset source, is adjusted. In one or many embodiment(s) described herein, the source backup policy may refer to a set of rules and procedures outlining a strategy for protecting (e.g., via any number of backup operations) enterprise information (or at least a portion thereof) maintained on the asset source, where the target asset may be accessible through the asset source. Further, the source backup policy may be adjusted, for example, through integration of the backup exclusion rule there-within, which would enforce the exclusion of the anomalous directory (associated with the backup exclusion rule) from any current and/or future backup operation(s) centered at least about the target asset.

Hereinafter, following Step 310, the method proceeds to Step 316 (see e.g., FIG. 3B).

Turning to FIG. 3B, in Step 316, following the alternate determination (made in Step 304) that the set of lists (obtained in Step 302), for the target asset slice, excludes a slice skip directory list, or following adjustment of a source backup policy (in Step 310) for an asset source, a determination is made as to whether the set of lists, for the target asset slice, includes a slice skip file list (described below). In one or many embodiment(s) described herein, if it is determined that the set of lists, for the target asset slice, includes a slice skip file list, then the method proceeds to Step 318. On the other hand, in one or many other embodiment(s) described herein, if it is alternatively determined that the set of lists, for the target asset slice, excludes a slice skip file list, then the method alternatively proceeds to Step 324 (described further below).

In one or many embodiment(s) described herein, the slice skip file list may refer to a document (e.g., a JavaScript Object Notation (JSON) file, a Comma Separated Values (CSV) file, a Yet Another Markup Language (YAML) file, etc.) configured to include the object metadata for any number of anomalous files identified in the target asset slice. Further, said object metadata, for any given anomalous file, may include: an object path specifying a file system location of the given anomalous file; an object type (i.e., file type, format, and/or extension) associated with the given anomalous file; and at least one reason (exemplified above-see e.g., FIGS. 2A-2C) justifying a skipping of the given anomalous file from any current/future backup operation(s).

Returning to the method, in Step 318, following the determination (made in Step 316) that the set of lists (obtained in Step 302), for the target asset slice, includes a slice skip file list, a slice file exclusion object, for the target asset slice, is created. In one or many embodiment(s) described herein, the slice file exclusion object may refer to a data container or a data structure configured to maintain the slice skip file list.

In Step 320, based on the slice file exclusion object (created in Step 318), a backup exclusion rule is created. In one or many embodiment(s) described herein, the backup exclusion rule may refer to a rule (or filter) configured to exclude the anomalous file, represented through the slice file exclusion object, from any current and/or future backup operation(s) centered at least about the target asset.

In Step 322, using the backup exclusion rule (created in Step 320), a source backup policy, for an asset source, is adjusted. In one or many embodiment(s) described herein, the source backup policy may refer to a set of rules and procedures outlining a strategy for protecting (e.g., via any number of backup operations) enterprise information (or at least a portion thereof) maintained on the asset source, where the target asset may be accessible through the asset source. Further, the source backup policy may be adjusted, for example, through integration of the backup exclusion rule there-within, which would enforce the exclusion of the anomalous file (associated with the backup exclusion rule) from any current and/or future backup operation(s) centered at least about the target asset.

Hereinafter, following Step 322, the method proceeds to Step 324 (described below).

In Step 324, using the slice non-skip file list (included in the set of lists obtained in Step 302), a slice file inclusion object, for the target asset slice, is created. In one or many embodiment(s) described herein, the slice file inclusion object may refer to a data container or a data structure configured to maintain the slice non-skip file list.

Hereinafter, following Step 324, the method proceeds to Step 330 (see e.g., FIG. 3C).

Turning to FIG. 3C, in Step 330, following creation of a slice file inclusion object (in Step 324) for each of multiple target asset slices of the target asset, a target asset backup object is created. In one or many embodiment(s) described herein, the target asset backup object may refer to a container for storing any, scalable quantity of unstructured information relevant to successful backup of the target asset. The unstructured information, accordingly, may include: the slice directory exclusion object (if created in Step 306) for each target asset slice of the multiple target asset slices of the target asset; the slice file exclusion object (if created in Step 318) for each target asset slice of the multiple target asset slices of the target asset; and the slice file inclusion object (created in Step 324) for each target asset slice of the multiple target asset slices of the target asset.

In Step 332, the target asset backup object (created in Step 330), for the target asset, is provided, or otherwise transmitted, to the asset source (from which the target asset backup metadata had been received in Step 300).

Figure 4:
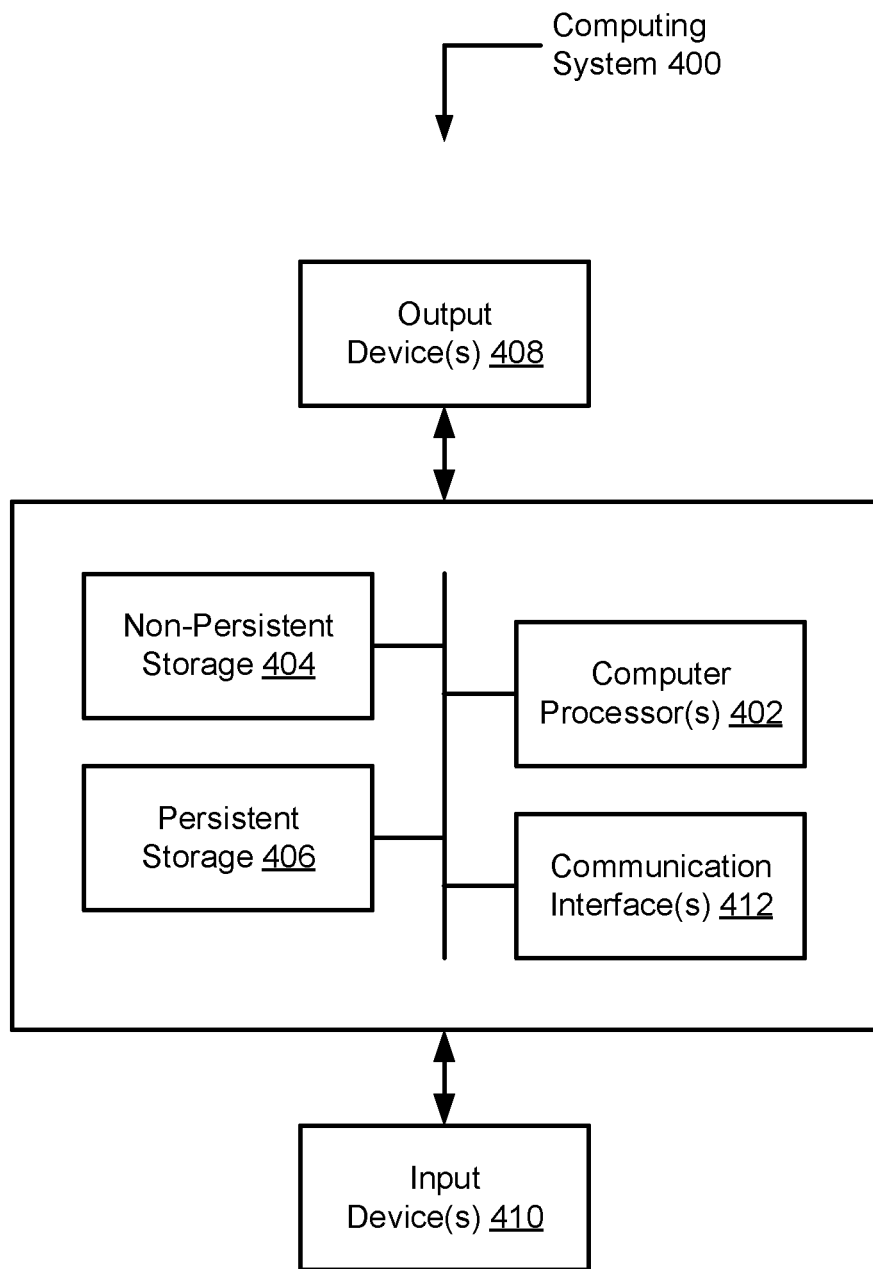
FIG. 4 shows an exemplary computing system in accordance with one or more embodiments described herein.

FIG. 4 shows an exemplary computing system in accordance with one or more embodiments described herein. The computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one or many embodiment(s) described herein, the computer processor(s) (402) may be an integrated circuit for processing instructions. For example, the computer processor(s) may be one or more cores or micro-cores of a central processing unit (CPU) and/or a graphics processing unit (GPU). The computing system (400) may also include one or more input devices (410), such as a touchscreen, keyboard, mouse, microphone, touchpad, electronic pen, or any other type of input device. Further, the communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

In one or many embodiment(s) described herein, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While the technology has been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for exclusion rule creation, the method comprising:
   identifying a target asset;
   for at least one target asset slice of multiple target asset slices partitioning the target asset:
      crawling target asset slice objects of the at least one target asset slice using a depth first search traversal algorithm;
      identifying, based on the crawling, an anomalous target asset slice object, wherein an anomalous target asset slice object is one selected from a group consisting of a snapshot object, a hidden object, and a corrupt object;
      adding object metadata for the anomalous target asset slice object to a slice skip list, wherein the object metadata comprises:
         an object path indicating a file system location of the anomalous target asset slice object in the target asset, and
         a reason justifying an addition of the anomalous target asset slice object to the slice skip list;
      creating a backup exclusion rule based on the slice skip list; and
      adjusting, using the backup exclusion rule, a source backup policy associated with an asset source through which the target asset is accessible.

2. The method of claim 1, wherein the target asset is one selected from a group comprising local storage, a network attached storage (NAS) share, a virtual machine, and a database application.

3. The method of claim 1, wherein the anomalous target asset slice object is a directory.

4. The method of claim 3, wherein the object metadata further comprises:
   a number of child objects within the directory.

5. The method of claim 1, wherein the anomalous target asset slice object is a file.

6. The method of claim 5, wherein the object metadata further comprises:
   a file type of the file.

7. A non-transitory computer readable medium (CRM) comprising computer readable program code, which when executed by a computer processor, enables the computer processor to perform a method for exclusion rule creation, the method comprising:
   identifying a target asset;
   for at least one target asset slice of multiple target asset slices partitioning the target asset:
      crawling target asset slice objects of the at least one target asset slice using a depth first search traversal algorithm;

identifying, based on the crawling, an anomalous target asset slice object, wherein an anomalous target asset slice object is one selected from a group consisting of a snapshot object, a hidden object, and a corrupt object;

adding object metadata for the anomalous target asset slice object to a slice skip list, wherein the object metadata comprises:

an object path indicating a file system location of the anomalous target asset slice object in the target asset, and a reason justifying an addition of the anomalous target asset slice object to the slice skip list;

creating a backup exclusion rule based on the slice skip list; and adjusting, using the backup exclusion rule, a source backup policy associated with an asset source through which the target asset is accessible.

8. The non-transitory CRM of claim 7, wherein the target asset is one selected from a group comprising local storage, a network attached storage (NAS) share, a virtual machine, and a database application.

9. The non-transitory CRM of claim 7, wherein the anomalous target asset slice object is a directory.

10. The non-transitory CRM of claim 9, wherein the object metadata further comprises:

a number of child objects within the directory.

11. The non-transitory CRM of claim 7, wherein the anomalous target asset slice object is a file.

12. The non-transitory CRM of claim 11, wherein the object metadata further comprises:

a file type of the file.

13. A system, the system comprising:

a target asset;

an asset source through which the target asset is accessible, and comprising:

a first computer processor configured to at least in part perform a method for exclusion rule creation, the method comprising:

identifying the target asset;

for at least one target asset slice of multiple target asset slices partitioning the target asset:

crawling target asset slice objects of the at least one target asset slice using a depth first search traversal algorithm;

identifying, based on the crawling, an anomalous target asset slice object, wherein an anomalous target asset slice object is one selected from a group consisting of a snapshot object, a hidden object, and a corrupt object; and adding object metadata for the anomalous target asset slice object to a slice skip list, wherein the object metadata comprises:

an object path indicating a file system location of the anomalous target asset slice object in the target asset, and a reason justifying an addition of the anomalous target asset slice object to the slice skip list; and a backup service operatively connected to the asset source, and comprising:

a second computer processor configured to receive at least the slice skip list from the asset source and at least in part perform the method for exclusion rule creation, the method further comprising:

for the at least one target asset slice of the multiple target asset slices creating a backup exclusion rule based on the slice skip list; and adjusting, using the backup exclusion rule, a source backup policy associated with an asset source through which the target asset is accessible.

14. The system of claim 13, wherein the target asset is one selected from a group comprising local storage, a network attached storage (NAS) share, a virtual machine, and a database application.

15. The system of claim 13, wherein the anomalous target asset slice object is a directory.

16. The system of claim 15, wherein the object metadata further comprises:

a number of child objects within the directory.

17. The system of claim 13, wherein the anomalous target asset slice object is a file.

18. The system of claim 17, wherein the object metadata further comprises:

a file type of the file.

* * * * *